United States Patent [19]  [11] 4,166,559
Richardson  [45] Sep. 4, 1979

[54] NOTEPAD ATTACHMENT

[75] Inventor: Kenneth Richardson, New Romney, England

[73] Assignee: Memoriser Limited, Sussex, England

[21] Appl. No.: 870,812

[22] Filed: Jan. 19, 1978

[30] Foreign Application Priority Data

Jan. 20, 1977 [GB] United Kingdom ............... 02368/77

[51] Int. Cl.² ............................................... B60R 7/08
[52] U.S. Cl. .................................. 224/276; 40/10 A; 108/44
[58] Field of Search ................. 224/29 E, 29 L, 29 R, 224/42.42 R, 42.45 R; 248/441 R; 108/44, 45; 40/10 R, 10 A, 10 B

[56] References Cited
U.S. PATENT DOCUMENTS 1,289,978 12/1918 Ward .............................. 224/29 E X
1,347,222 7/1920 Hufschmidt ................ 224/29 E UX
1,892,721 1/1933 Cardarelli .................... 224/29 E UX
2,732,642 1/1956 Thompson ..................... 224/29 E X Primary Examiner—David A. Scherbel
Assistant Examiner—Jerold M. Forsberg
Attorney, Agent, or Firm—Wenderoth, Lind & Ponack

[57] ABSTRACT

A notepad attachment for mounting a notepad onto the hub of a steering wheel of a motor vehicle includes a platform member with a recess therein, and an annular resilient mounting cushion which is disposed between the platform member and the hub of the steering wheel. An elastic cord or lace is threaded through annularly spaced holes in the base of the recess and round the back of the spoke or spokes of the wheel. The notepad is disposed in the recess of the platform, and a further recess is provided in the platform member for a pencil which is anchored to the platform member by a suitable cord.

6 Claims, 6 Drawing Figures

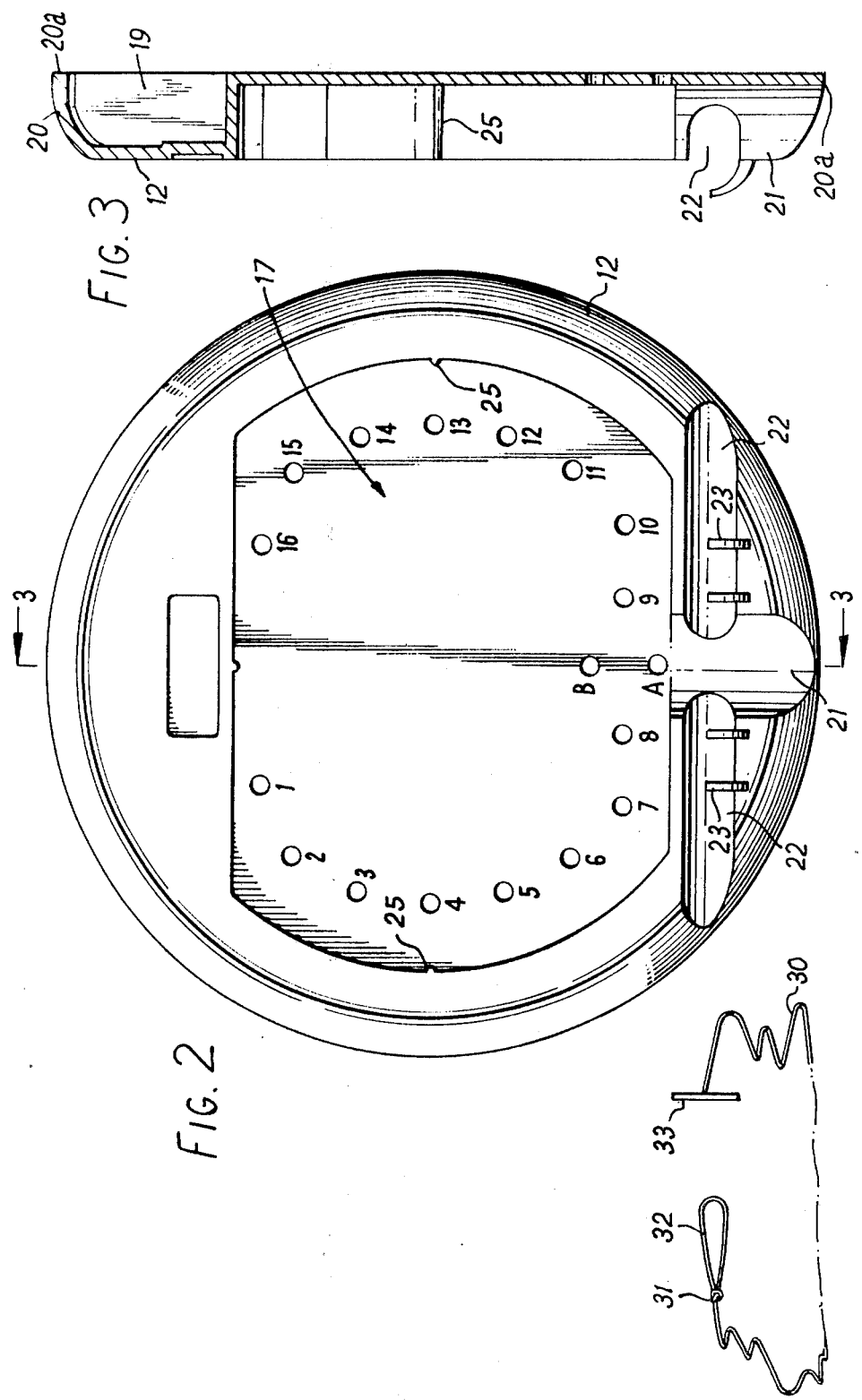

NOTEPAD ATTACHMENT

BACKGROUND AND SUMMARY OF THE INVENTION

This invention relates to a notepad attachment for a vehicle steering wheel.

According to this invention there is provided a notepad attachment for a vehicle steering wheel having a hub and one or more spokes, which attachment comprises a platform member for resting against the hub of the wheel with the general plane of the platform member substantially normal to the axis of rotation of the wheel, the platform member having circumferentially-spaced apertures or other guides for a flexible tie whereby the platform member can be anchored to the spoke or spokes of the wheel, and a notepad secured to and backed by the platform member.

The platform member may conveniently have a clip or other holder for releasably locating a pencil, ball point pen or other writing instrument, and the writing instrument may be attached to the platform member by a cord so that the instrument does not become lost if released by the user.

In a preferred construction, a resilient mounting cushion is disposed between the platform member and the steering-wheel so as to prevent the platform member from rattling against the steering wheel.

According to a preferred feature of the invention, the flexible tie means comprises an elastically extensible cord or threading lace which can be threaded through the apertures and behind the spoke or spokes of the steering wheel for securing the platform member to the steering wheel. The number and arrangement of the apertures is preferably such that the platform member can be disposed with the apertures symmetrically arranged with respect to the spokes of a wheel having any number of spokes from one to four.

BRIEF DESCRIPTION OF THE DRAWINGS

One embodiment of the invention will now be described by way of example with reference to the accompanying drawings in which:

FIG. 2 is a front view of the platform member of the attachment of FIG. 1, with the notepad detached;

FIG. 3 is a sectional side view on the line 3—3 of FIG. 2;

DETAILED DESCRIPTION OF THE INVENTION

Figure 1:
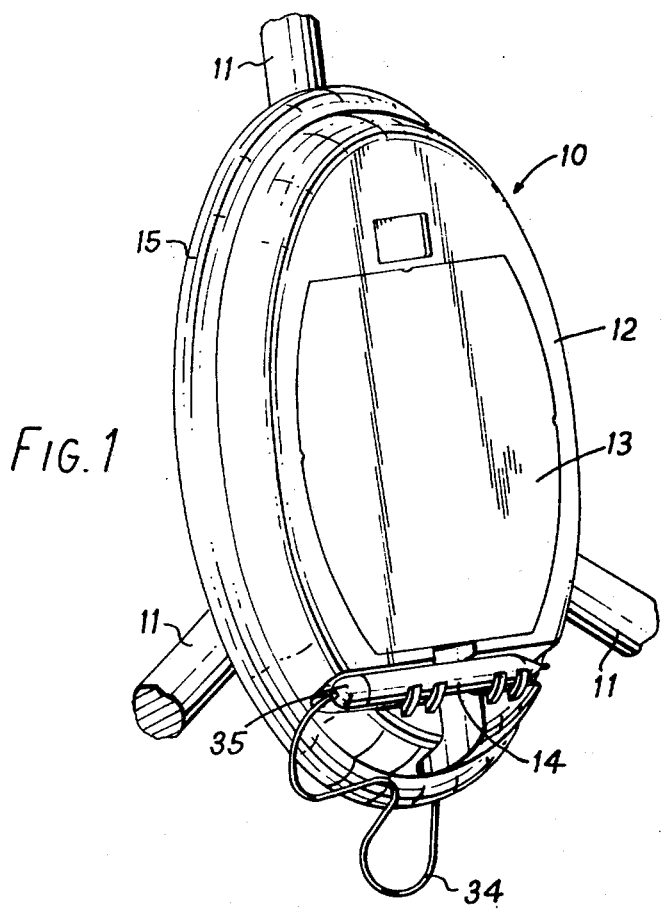
FIG. 1 is a perspective view of an attachment according to the invention in place on a steering wheel.

Referring to FIG. 1 of the drawings, a notepad attachment 10 according to the invention is shown in place on the hub of a steering wheel having three spokes 11. The illustrated attachment includes principally a platform member 12 attached by an elasticated cord (not visible) to the spokes; a notepad 13 disposed in a recess in the platform member; a pencil 14 in an elongate slot in the platform member; and a mounting cushion 15 made from a resilient plastics material (PVC in this particular instance) and serving to prevent the platform member from slipping and rattling against the spokes.

The platform member 12 is shown in more detail in FIGS. 2 to 5 and is a moulding, made for example from polypropylene. The floor 18 of the recess 17 for the notepad also constitutes the back of the member and has in it a series of circumferentially spaced holes numbered 1 to 16 on the moulding and two holes indicated by A and B also marked on the moulding. Stiffening ribs 19 are formed at the rear of the member and extend between its outer rim 20 and the sidewall of the recess 17. A thumb slot 21 is formed on the front face of the member to enable pages of the notepad to be lifted by the thumb and detached. The thumb slot traverses a slot 22 for the pencil 14, and grips 23 moulded integrally with the platform member hold the pencil resiliently in the slot.

To assist in holding the notepad firmly in position two gripping ribs 25 are formed on the side walls of the recess.

Figure 6:
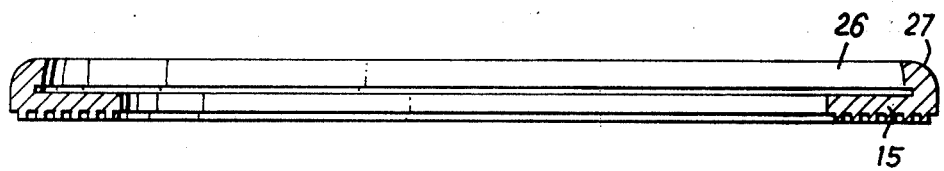
FIG. 6 is a sectional elevation of the mounting cushion of the attachment.
Figure 5:
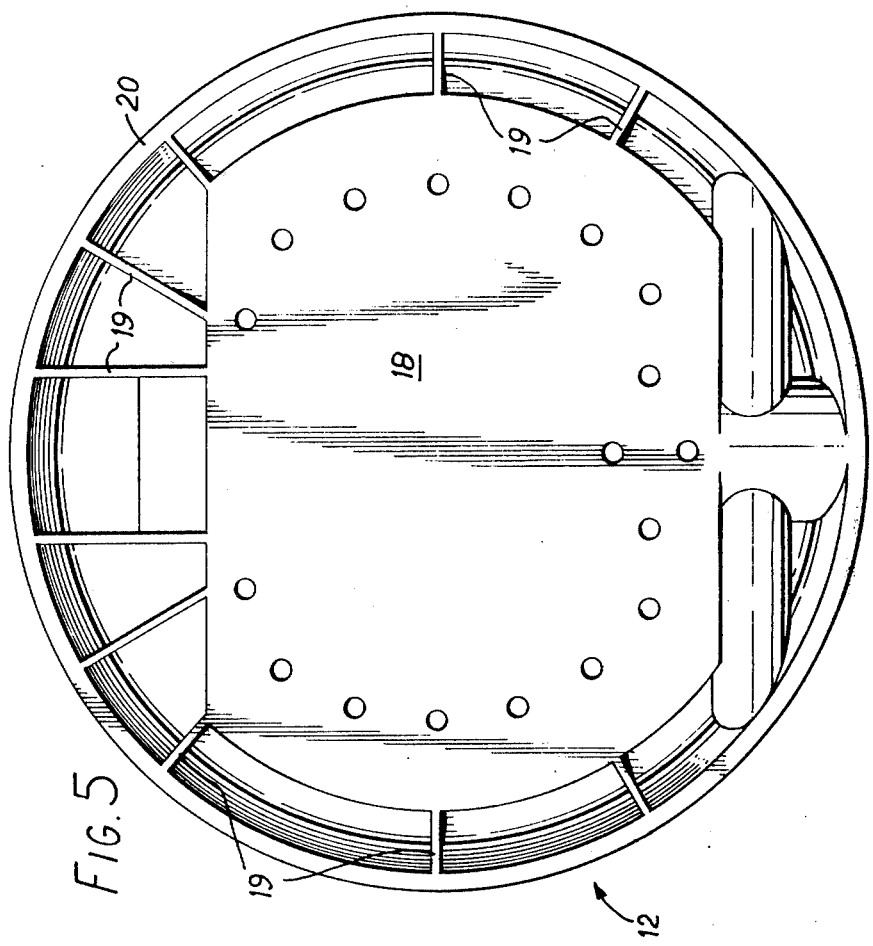
FIG. 5 is a rear view of the platform member of FIG. 2.
Figure 4:
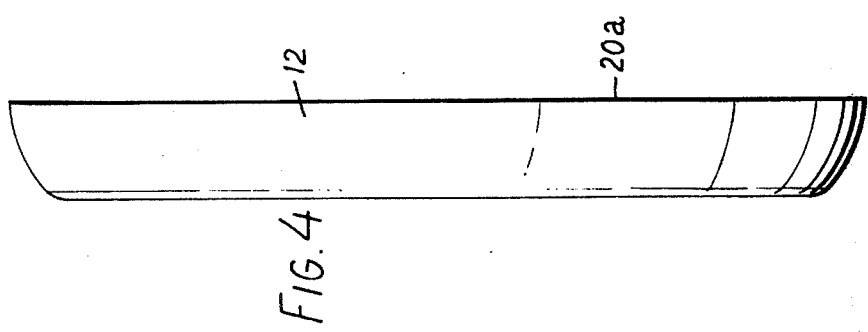
FIG. 4 is a side view of the platform member of FIG. 2.

In use, the edge 20a of the rim of member 12 is received in an annular recess 26 in the mounting cushion 15 (see FIG. 6), and the edge flange 27 of the cushion has its inner face inclined so as to fit closely against the rim 20 of the member 12. The cushion 15 has a central aperture whose radius is greater than the distance of the holes 1 to 7 and 10 to 16 from the centre of the platform member, so that the cushion does not impede the attachment of the platform member to the wheel spokes. The underside of the cushion has a series of annular ridges for improved resistance of the cushion to slipping on the steering wheel hub.

The elasticated cord 30 used to secure the attachment is indicated in FIG. 2 and has a stop knot 31 and loop 32 at one end and a metal tag 33 to the middle of which the other end of the cord is attached.

A non-elastic cord 34 is provided having a ferrule 35 at one end to grip the upper end of the pencil 14 and a metal tag to the middle of which the other end is secured.

To secure the attachment to the steering wheel, the platform member 12 is first assembled with the mounting cushion 15, and the notepad is removed from the recess 17. Next the tag (not shown) of the pencil cord is pushed upward through the hole A and downward through hole B, so that this end of the pencil cord is anchored. Then the tag 33 of the elasticated cord 30 is pushed upward through hole 1 and the cord is pulled through until the stop knot 31 comes against the underside of the platform member. The platform member 12 and mounting cushion 15 are then placed on the hub of the steering wheel slightly downward of the centre, and the tag 33 of cord 30 is fed downward through the hole directly at the adjacent side of the left-hand spoke, then round the spoke and upward through the hole at the other side of spoke, and similarly in an counterclockwise direction round the other spokes, finishing at hole 15. Then working along the cord from the loop tension is applied to each part of the cord starting at hole 2 and finishing at hole 15. Maintaining the tension in the cord, the tag is pushed downward through hole 16, the cord is pulled taut and is wound counterclockwise round the steering wheel above the spokes until the tag can be engaged, under tension, in the loop 32 behind hole 1. The notepad and pencil are then placed in their positions, the former being pressed down firmly.

To secure the attachment to a single-spoke steering wheel the threading of the extensible cord is modified. Assuming that the spoke extends symmetrically towards the driver, the tag of the cord is threaded upward through hole 11 leaving the loop just behind the platform member. The attachment is then placed on the hub of the steering wheel downward of the centre and the tag is threaded downward through hole 10, passed round the spoke and up through hole 7, down through hole 3, counterclockwise round the hub of the wheel, and up through hole 14. Tension is then applied to the cord, section by section, from the looped end and, while maintaining the tension, the tag is pressed down through hole 13 and the cord is pulled taut and wound counterclockwise around the hub until, with cord under tension, the tag can be engaged in the loop behind hole 11. The notepad and pencil are then placed in position, the former being pressed down firmly.

The attachment can thus be mounted quickly and easily on any steering wheel having any number of spokes and provides a convenient means for the driver of a vehicle to make notes without searching for the necessary paper and pencil.

The attachment may carry a clock, for example a digital clock. Additionally or alternatively the attachment may carry the microphone and operating switches of a sound recording apparatus such as a tape recorder and may, since sound recording apparatus is now available in very small sizes, carry the whole of the recording apparatus.

I claim:

1. An apparatus to be connected to the steering wheel of a vehicle for holding a notepad, said apparatus comprising:

a platform member to be positioned over the hub of said steering wheel normal to the axis of rotation of said steering wheel, said platform member having a rigid recess in the bottom thereof for receiving said notepad and a plurality of holes through said recess;

resilient cushion means surrounding and holding therein the edge of said platform member and positioned between said platform member and said steering wheel for cushioning said platform member from said steering wheel and for preventing said platform member from rattling against said wheel, the center portion of said cushion means being open behind said holes in said platform member; and flexible cording means fitted through said holes in said platform member and surrounding said steering wheel beneath said platform member for securing said platform member and cushion means thereunderneath against said steering wheel.

2. An apparatus as claimed in claim 1, further comprising means attached to said platform member for receiving and holding therein a writing instrument.

3. An apparatus as claimed in claim 1, wherein said platform member has a writing instrument recess therein for holding a writing instrument.

4. An apparatus as claimed in claim 1, further comprising a cord for connecting a writing instrument to said platform member.

5. An apparatus as claimed in claim 1, wherein said flexible cording means is comprised of one elastically extensible cord fitted through said holes.

6. An apparatus as claimed in claim 1, wherein said resilient cushion means has, on the underneath surface thereof adjacent said steering wheel, a plurality of circumferential concentric ridges.

* * * * *